(12) United States Patent
Joshi et al.

(10) Patent No.: US 9,323,726 B1
(45) Date of Patent: Apr. 26, 2016

(54) OPTIMIZING A GLYPH-BASED FILE

(75) Inventors: Lokesh Joshi, Mercer Island, WA (US);
Satishkumar Kothandapani Shanmugasundaram, Chennai (IN);
Nadia C. Payet, Seattle, WA (US);
Viswanath Sankaranarayanan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 13/535,175

(22) Filed: Jun. 27, 2012

(51) Int. Cl.
*G09G 5/00* (2006.01)
*G06F 17/22* (2006.01)
*G06K 9/46* (2006.01)
*G06K 9/48* (2006.01)
*G06T 11/20* (2006.01)

(52) U.S. Cl.
CPC .......... *G06F 17/2223* (2013.01); *G06K 9/4671* (2013.01); *G06K 9/481* (2013.01); *G06K 2209/01* (2013.01); *G06T 11/203* (2013.01)

(58) Field of Classification Search
CPC ..... H04N 5/44504; H04N 9/641; G09G 5/40; G09G 5/246; G09G 2340/125; G06T 11/203; G06T 11/60; G06F 3/018; G06K 9/4671; G06K 2209/01; G06K 9/481
See application file for complete search history.

(56) References Cited

U.S. PATENT DOCUMENTS

| | | | | |
|---|---|---|---|---|
| 4,173,753 A | * | 11/1979 | Chou | 382/185 |
| 4,251,871 A | * | 2/1981 | Yu | 345/472.3 |
| 4,490,789 A | * | 12/1984 | Leban et al. | 715/234 |
| 4,511,267 A | * | 4/1985 | Pokorny et al. | 400/110 |
| 4,566,128 A | * | 1/1986 | Araki | 382/242 |
| 4,621,340 A | * | 11/1986 | Pokorny et al. | 345/468 |
| 4,670,841 A | * | 6/1987 | Kostopoulos | 715/273 |
| 4,723,217 A | * | 2/1988 | Nakano et al. | 715/264 |
| 4,739,318 A | * | 4/1988 | Cohen | 345/472.3 |
| 4,850,026 A | * | 7/1989 | Jeng et al. | 382/185 |
| 5,109,352 A | * | 4/1992 | O'Dell | 715/262 |
| 5,305,207 A | * | 4/1994 | Chiu | 715/210 |
| 5,444,840 A | * | 8/1995 | Froessl | G06F 17/30253 |
| 5,468,077 A | * | 11/1995 | Motokado et al. | 400/76 |
| 5,574,842 A | * | 11/1996 | Takakura | G06K 15/02 715/210 |
| 5,586,198 A | * | 12/1996 | Lakritz | 382/185 |
| 5,586,241 A | * | 12/1996 | Bauermeister et al. | 345/467 |
| 5,673,064 A | * | 9/1997 | Seto | 345/472 |
| 5,727,140 A | * | 3/1998 | Ohtomo et al. | 345/467 |
| 5,768,451 A | * | 6/1998 | Hisamitsu | G06K 9/723 382/309 |
| 5,831,636 A | * | 11/1998 | Merchant et al. | 345/467 |
| 5,835,100 A | * | 11/1998 | Matsufusa | 345/467 |
| 5,903,904 A | * | 5/1999 | Peairs | 715/209 |
| 5,917,501 A | * | 6/1999 | Muller et al. | 345/467 |
| 5,943,443 A | * | 8/1999 | Itonori | G06K 9/72 358/403 |
| 5,969,727 A | * | 10/1999 | Kaneko | G09G 5/222 345/536 |

(Continued)

*Primary Examiner* — Phi Hoang
*Assistant Examiner* — Charles L Beard
(74) *Attorney, Agent, or Firm* — Knobbe, Martens, Olson & Bear, LLP

(57) ABSTRACT

Systems and methods are provided for optimizing a glyph-based file. Individual components may be identified within glyphs of a file. Each identified component within a glyph may be a portion of the glyph, and may be a joint component or disjoint component. Groupings of components may then be determined, where the groupings are determined based at least in part by identifying similarly shaped components. A representative component may then be selected from each grouping. Composite glyphs may be generated and stored in an optimized file, where each composite glyph includes a reference to at least one representative component.

15 Claims, 6 Drawing Sheets

(56) References Cited

U.S. PATENT DOCUMENTS

| | | | |
|---|---|---|---|
| 5,982,387 A * | 11/1999 | Hellmann | G06K 15/02 345/467 |
| 6,003,049 A * | 12/1999 | Chiang | 715/234 |
| 6,144,765 A * | 11/2000 | Tamura et al. | 382/197 |
| 6,181,353 B1 * | 1/2001 | Kurisu | G09G 5/42 345/537 |
| 6,341,176 B1 * | 1/2002 | Shirasaki | G06K 9/72 382/229 |
| 6,483,510 B1 * | 11/2002 | Jeong | 345/467 |
| 6,501,475 B1 * | 12/2002 | Cheng | G06T 11/203 345/467 |
| 6,661,417 B1 * | 12/2003 | Cheng | G06F 17/214 345/469 |
| 6,697,524 B1 * | 2/2004 | Arai et al. | 382/187 |
| 6,704,116 B1 * | 3/2004 | Abulhab | G06F 17/214 358/1.11 |
| 6,748,115 B1 * | 6/2004 | Gross | 382/237 |
| 6,766,179 B1 * | 7/2004 | Shiau et al. | 455/566 |
| 6,771,267 B1 * | 8/2004 | Muller | 345/467 |
| 6,867,787 B1 * | 3/2005 | Shimizu et al. | 345/629 |
| 6,879,951 B1 * | 4/2005 | Kuo | G10L 13/08 704/1 |
| 6,882,344 B1 * | 4/2005 | Hayes et al. | 345/467 |
| 6,947,771 B2 * | 9/2005 | Guo et al. | 455/566 |
| 6,952,210 B1 * | 10/2005 | Renner et al. | 345/471 |
| 6,956,968 B1 * | 10/2005 | O'Dell et al. | 382/182 |
| 6,992,671 B1 * | 1/2006 | Corona | G06T 9/20 345/467 |
| 7,003,158 B1 * | 2/2006 | Bennett et al. | 382/187 |
| 7,009,612 B2 * | 3/2006 | Hakamada | G06T 11/203 345/467 |
| 7,012,605 B1 * | 3/2006 | Manome | 345/469 |
| 7,251,365 B2 * | 7/2007 | Fux et al. | 382/185 |
| 7,263,658 B2 * | 8/2007 | Chou | 715/262 |
| 7,443,400 B2 * | 10/2008 | Matskewich et al. | 345/467 |
| 7,539,939 B1 * | 5/2009 | Schomer | 715/234 |
| 7,573,476 B2 * | 8/2009 | Matskewich et al. | 345/471 |
| 7,612,897 B2 * | 11/2009 | Hodder | G06F 17/214 345/171 |
| 7,710,422 B2 * | 5/2010 | Matskewich et al. | 345/467 |
| 7,787,694 B2 * | 8/2010 | Fux et al. | 382/185 |
| 8,243,077 B2 * | 8/2012 | Cheng | 345/469 |
| 8,290,269 B2 * | 10/2012 | Wu | G06F 17/30253 382/177 |
| 8,295,600 B2 * | 10/2012 | Wu | G06K 9/4671 382/177 |
| 8,352,855 B2 * | 1/2013 | Levy | G06F 17/211 715/234 |
| 2002/0064311 A1 * | 5/2002 | Yahagi | 382/224 |
| 2002/0085006 A1 * | 7/2002 | Shade et al. | 345/471 |
| 2003/0027601 A1 * | 2/2003 | Guo et al. | 455/566 |
| 2003/0043151 A1 * | 3/2003 | Choi et al. | 345/467 |
| 2004/0006749 A1 * | 1/2004 | Fux | G06F 17/214 715/263 |
| 2004/0012591 A1 * | 1/2004 | Ito et al. | 345/470 |
| 2004/0148577 A1 * | 7/2004 | Xu et al. | 715/530 |
| 2004/0155882 A1 * | 8/2004 | Wu | 345/467 |
| 2004/0227771 A1 * | 11/2004 | Arnold et al. | 345/611 |
| 2005/0106537 A1 * | 5/2005 | Chepaitis | G09B 21/00 434/114 |
| 2005/0162430 A1 * | 7/2005 | Stamm et al. | 345/472 |
| 2005/0174314 A1 * | 8/2005 | Furihata | G09G 5/40 345/98 |
| 2006/0017733 A1 * | 1/2006 | Matskewich | G09G 5/246 345/467 |
| 2006/0079281 A1 * | 4/2006 | Ravindra et al. | 455/558 |
| 2006/0095843 A1 * | 5/2006 | Chou | 715/535 |
| 2006/0181532 A1 * | 8/2006 | Ravindra et al. | 345/467 |
| 2006/0238539 A1 * | 10/2006 | Opstad | 345/469 |
| 2006/0256116 A1 * | 11/2006 | Burago et al. | 345/467 |
| 2007/0139415 A1 * | 6/2007 | Stamm et al. | 345/472 |
| 2007/0154094 A1 * | 7/2007 | Lin et al. | 382/187 |
| 2007/0160292 A1 * | 7/2007 | Wu | 382/181 |
| 2007/0189628 A1 * | 8/2007 | Nolan et al. | 382/254 |
| 2008/0030502 A1 * | 2/2008 | Chapman | 345/472.3 |
| 2008/0063278 A1 * | 3/2008 | Vincent | G06K 9/00463 382/182 |
| 2008/0063279 A1 * | 3/2008 | Vincent | G06K 9/00463 382/182 |
| 2008/0068383 A1 * | 3/2008 | Dowling | 345/441 |
| 2008/0068384 A1 * | 3/2008 | Achong et al. | 345/472 |
| 2008/0100623 A1 * | 5/2008 | Gurcan | G06T 11/203 345/467 |
| 2008/0170810 A1 * | 7/2008 | Wu | G06K 9/4671 382/305 |
| 2008/0193015 A1 * | 8/2008 | Hong | 382/187 |
| 2008/0218522 A1 * | 9/2008 | Fux et al. | 345/472 |
| 2008/0221866 A1 * | 9/2008 | Katragadda et al. | 704/8 |
| 2008/0240567 A1 * | 10/2008 | Chaoweeraprasit et al. | 382/182 |
| 2008/0306916 A1 * | 12/2008 | Gonzalez | G06F 17/214 |
| 2009/0028435 A1 * | 1/2009 | Wu et al. | 382/190 |
| 2009/0097765 A1 * | 4/2009 | Kimura et al. | 382/243 |
| 2009/0153471 A1 * | 6/2009 | Lee | 345/156 |
| 2009/0310868 A1 * | 12/2009 | Oota | 382/199 |
| 2009/0324082 A1 * | 12/2009 | Liu et al. | 382/185 |
| 2010/0039916 A1 * | 2/2010 | Hasegawa et al. | 369/100 |
| 2010/0053171 A1 * | 3/2010 | Cheng | G06T 11/203 345/469 |
| 2010/0174732 A1 * | 7/2010 | Levy | G06F 17/211 707/768 |
| 2010/0238473 A1 * | 9/2010 | Tanaka | G06T 11/60 358/1.11 |
| 2010/0245362 A1 * | 9/2010 | Huang | G06T 11/203 345/467 |
| 2011/0090230 A1 * | 4/2011 | Bacus et al. | 345/467 |
| 2011/0093565 A1 * | 4/2011 | Bacus et al. | 709/219 |
| 2011/0141029 A1 * | 6/2011 | Fux | 345/171 |
| 2011/0286662 A1 * | 11/2011 | Lai | 382/161 |
| 2011/0298719 A1 * | 12/2011 | Wong | 345/171 |
| 2012/0069027 A1 * | 3/2012 | Yamazaki et al. | 345/472.3 |
| 2012/0081297 A1 * | 4/2012 | Heo | 345/171 |
| 2012/0089632 A1 * | 4/2012 | Zhou et al. | 707/769 |
| 2012/0092345 A1 * | 4/2012 | Joshi et al. | 345/471 |
| 2012/0235920 A1 * | 9/2012 | Fux | 345/164 |
| 2012/0331383 A1 * | 12/2012 | Park | 715/703 |
| 2013/0057554 A1 * | 3/2013 | Linnerud | G06T 11/203 345/471 |
| 2013/0113806 A1 * | 5/2013 | Naveh | 345/467 |
| 2013/0120396 A1 * | 5/2013 | Kaplan | G06T 11/203 345/471 |
| 2013/0127872 A1 * | 5/2013 | Kaplan | G06T 11/203 345/467 |
| 2013/0155098 A1 * | 6/2013 | Rickner et al. | 345/619 |
| 2015/0139559 A1 * | 5/2015 | Smith | G06K 9/6215 382/225 |

\* cited by examiner

OPTIMIZING A GLYPH-BASED FILE

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more and more page images of content are becoming available online. A page image allows a reader to see the page of content as it would appear in print.

Despite the great appeal of providing digital images of content, many content providers face challenges when generating, storing, and transferring the images of content, particularly when the accuracy of recognizing text in images is important. For example, to enable users to read page images from a book or magazine on a computer screen, or to print them for later reading, the images must be sufficiently clear to present legible text, including when scaled to various sizes. Typically, the images are translated into computer-readable data using various character recognition techniques, such as optical character recognition (OCR), which includes digital character recognition. Whether or not OCR is used, a page image may be processed and stored with reference to various glyphs appearing in the page. Glyphs may represent, for example, marks, characters, symbols or other elements appearing in the page. These glyphs may be defined in various ways, including by storing contour or outline information, such as outlines defined by Bezier curves.

One challenge faced by digital content providers is identifying individual glyphs from image data. This may be particularly difficult, for example, when an image includes cursive writing. Another challenge is the cost of storing and transferring glyph-based content. For example, for works written in certain languages, a large number of glyphs are often defined and stored in association with a glyph-based file in order to represent each distinct character or symbol appearing in the work. For glyphs corresponding to text in certain languages, for example, thousands of glyphs may be stored for a given glyph-based file.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
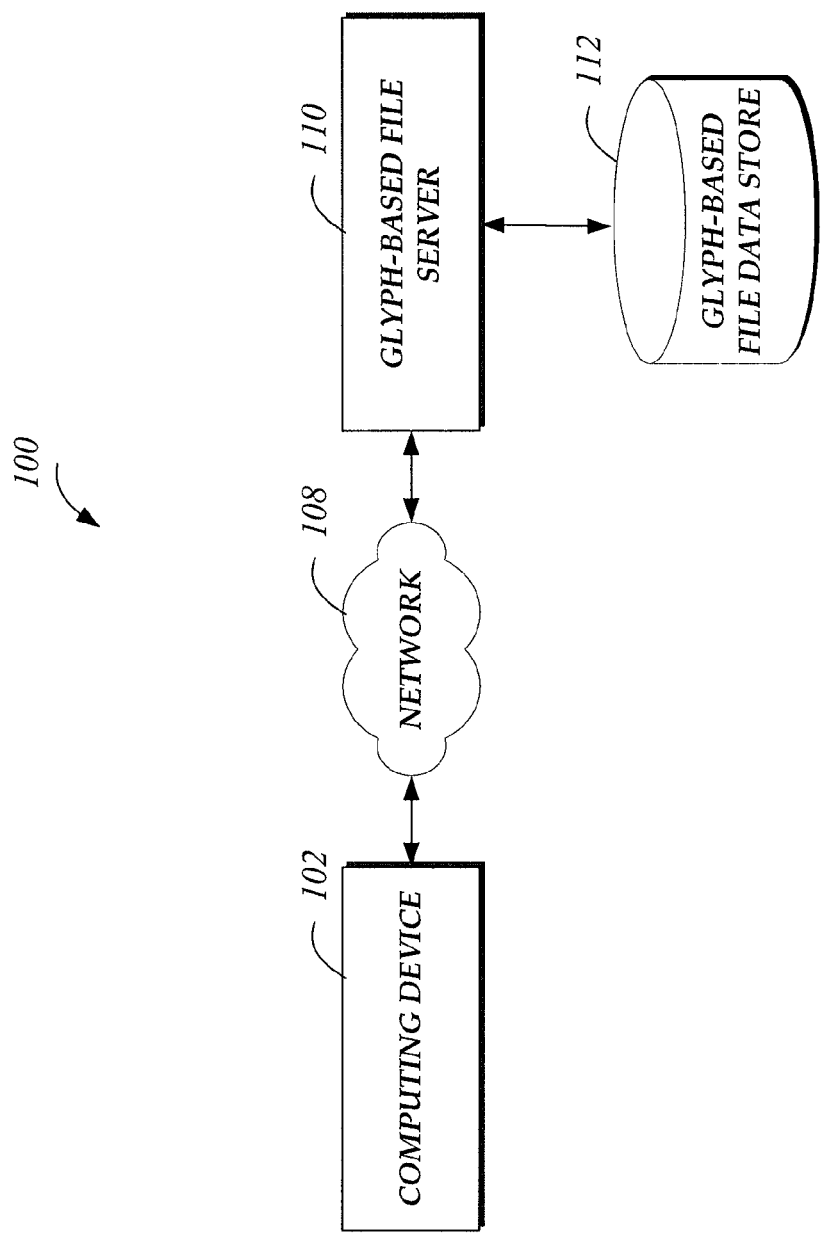
FIG. 1 is a block diagram depicting an illustrative operating environment in which a glyph-based file may be optimized by a glyph-based file server and optionally presented on a display of a computing device.

Generally described, aspects of the present disclosure relate to optimizing a glyph-based file for storage, as well as for any subsequent transfer to another computing device. In one embodiment, the glyph-based file may have been generated from an electronic (digital) image containing text, where the image has been scanned and converted into the glyph-based file. One example of a suitable method and system for scanning and converting an electronic image into a glyph-based file for rendering is described in U.S. Pat. No. 7,460,710 entitled "Converting Digital Images Containing Text to Token-Based Files for Rendering," issued Dec. 2, 2008, which patent is incorporated herein by reference in its entirety. Generally, a glyph may represent a single letter, character, symbol, etc., or may in some cases represent more than one letter, character, symbol, etc. or only a portion of a letter, character, symbol, etc. The "tokens" described in U.S. Pat. No. 7,460,710 may, in some embodiments, be considered glyphs. In other embodiments, glyphs may be associated with a font referenced in a glyph-based file, where each glyph is a letter, character or symbol of the font. Glyphs may be defined and stored in a variety of manners, including many that are well known in the art. For example, in some embodiments, glyphs may be defined with reference to one or more outlines that mathematically describe lines and/or curves representing or bounding a shape. An outline or contour may be stored, for example, in second degree or third degree Bezier curves. In some embodiments, a glyph stored in an outline format may be scaled or transformed, such as by emboldening, rotating, skewing, etc.

Aspects of the present disclosure relate to optimizing or reducing the size of a previously stored glyph-based file, such as by replacing at least a subset of the glyphs referenced in the glyph-based file with composite glyphs that each reference one or more shared components. In some embodiments, a glyph optimization module, as described herein, may optimize a glyph-based file by identifying individual components within glyphs referenced in the glyph-based file. Each identified component within a glyph may be a portion of the glyph. In some embodiments, the identified components of a glyph may include a joint component that is connected to at least one other portion of the glyph, and/or a disjoint component that is not connected to any other portion of the glyph. The glyph optimization module may then determine groupings of components, where the groupings are determined based at least in part by identifying similarly shaped components. The glyph optimization module may then select a representative component from each grouping. The module may then generate composite glyphs and store the composite glyphs in an optimized file, where each composite glyph may include a reference to at least one representative component.

In some embodiments, a glyph-based file server may store an optimized file that replaces at least some of the glyph references in the original glyph-based file with composite glyphs that reference shared components (for example, selected representative components from the groupings). The optimized file may require substantially less memory than the original glyph-based file, especially in the case of a file that includes a number of glyphs with similar portions. The glyph-based file server may then send the optimized file to one or more other computing devices, such as a user device, using less bandwidth than would be needed to send the original file prior to optimization. A computing device may subsequently generate a page image for display based on the optimized glyph-based file, such that the displayed page appears identical or nearly identical to a page generated based on the original glyph-based file. In some embodiments, because less glyph components may need to be stored for a given page image, page images generated based on an optimized file may be displayed using less RAM or other memory than would be needed to display page images generated based on the original glyph-based file. Accordingly, loading time and/or reading speed may be increased on a user device that generates page images from the optimized glyph-based file for display to a user.

FIG. 1 depicts an illustrative operating environment 100 in which a glyph-based file may be optimized by a glyph-based file server 110 and optionally sent to a computing device 102 for further storage and/or display. The depicted environment includes a computing device 102 and a glyph-based file server 110 communicatively connected by a network 108, such as the Internet. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like. In the illustrated embodiment, the computing device 102 may present for display a glyph-based file received from the glyph-based file server 110 via the network 108. In an illustrative embodiment, a suitable viewer (e.g., a browser or electronic book reader) application operates on the computing device 102 to cause it to present the glyph-based file data on a display or output medium.

As illustrated, the glyph-based file server 110 includes or communicates with a glyph-based file data store 112. Those skilled in the art will appreciate that the glyph-based file data store 112 may be local to the glyph-based file server 110, may be remote to the glyph-based file server 110, and/or may be a network-based service itself. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
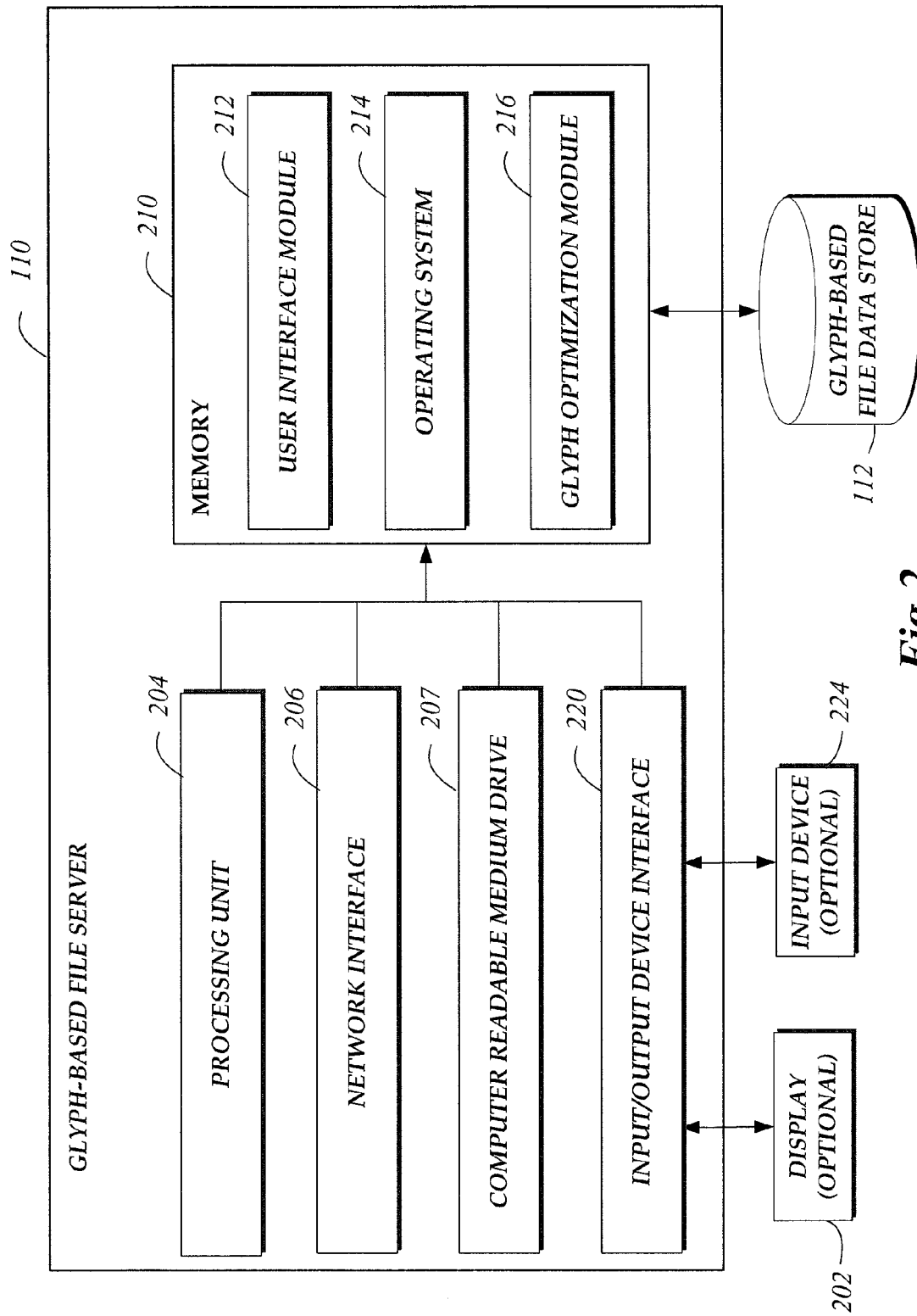
FIG. 2 depicts a general architecture of a glyph-based file server for optimizing a glyph-based file based at least in part on common components.

FIG. 2 depicts a general architecture of a glyph-based file server 110 for optimizing a glyph-based file based at least in part on common components of the glyphs. The general architecture of the glyph-based file server 110 depicted in FIG. 2 includes an arrangement of computer hardware and software components that may be used to implement aspects of the present disclosure. Those skilled in the art will appreciate that the glyph-based file server 110 may include many more (or fewer) components than those shown in FIG. 2. It is not necessary, however, that all of these generally conventional components be shown in order to provide an enabling disclosure. As illustrated in FIG. 2, the glyph-based file server 110 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, touch screen, etc.

The memory 210 contains computer program instructions that the processing unit 204 executes in order to implement one or more embodiments. The memory 210 generally includes RAM, ROM and/or other persistent, non-transitory memory. The memory 210 may store an operating system 214 that provides computer program instructions for use by the processing unit 204 in the general administration and operation of the glyph-based file server 110. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser or electronic book reader installed on the computing device. In addition, memory 210 may include or communicate with an auxiliary glyph-based file data store 112. Data stored in the glyph-based file data store 112 may include glyph-based files of various types, as discussed above.

In addition to the user interface module 212, the memory 210 may include a glyph optimization module 216 that may be executed by the processing unit 204. In one embodiment, the glyph optimization module 216 implements various aspects of the present disclosure, e.g., identifying common components of glyphs, grouping components, generating composite glyphs, etc., as described further below. While the glyph optimization module 216 is shown in FIG. 2 as part of the glyph-based file server 110, in other embodiments, all or a portion of a glyph optimization module 216 may be a part of the computing device 102. For example, in certain embodiments of the present disclosure, the computing device 102 may include several components that operate similarly to the components illustrated as part of the glyph-based file server 110, including a user interface module, glyph optimization module, processing unit, computer readable medium drive, etc. In such embodiments, the computing device 102 may communicate with a glyph-based file data store, such as glyph-based file data store 112, and the glyph-based file server 110 may not be needed in certain embodiments.

Figure 3:
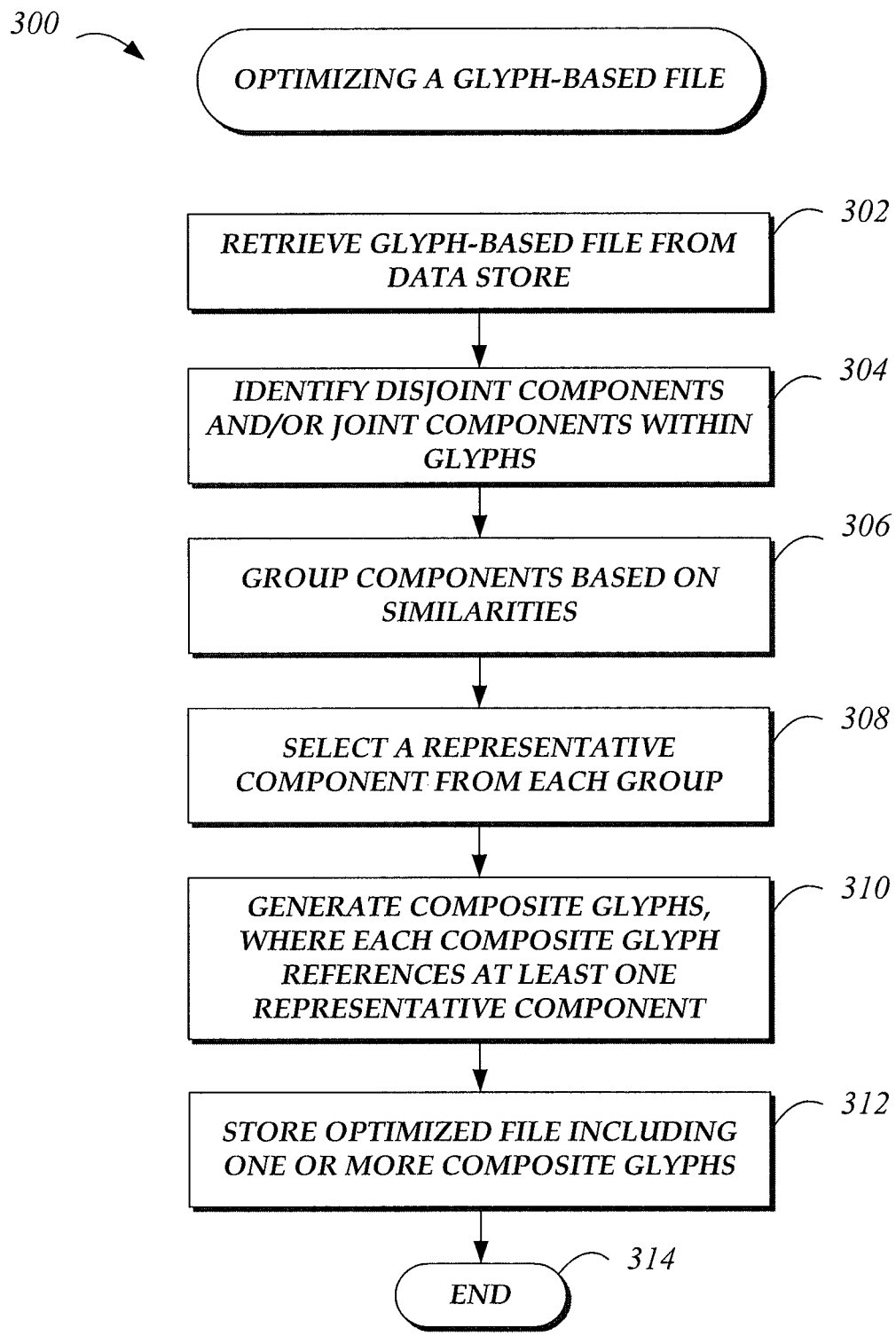
FIG. 3 is a flow diagram of an illustrative method implemented by a glyph optimization module for optimizing a glyph-based file.

FIG. 3 is a flow diagram of an illustrative method 300 implemented by the glyph optimization module 216. The illustrative method 300 may be implemented, for example, by the glyph optimization module of the glyph-based file server 110 in order to decrease the file size of a glyph-based file prior to sending the file to one or more other computing devices, such as computing device 102. The illustrative method begins at block 302, where the glyph optimization module 216 retrieves the glyph-based file to be optimized from a data store, such as glyph-based file data store 112. Depending on the embodiment, the glyph-based file may be retrieved from a data store local to glyph-based file server 110, retrieved from a data store remote from glyph-based file server 110, or received from another computing device. As discussed above, the retrieved glyph-based file may have been previously generated and stored using one or more existing methods. For example, generating the glyph-based file may have included scanning a number of page images of printed content and converting the electronic image(s) into glyph-based data that may be rendered as reflowable content that appears substantially similar to the original printed content. Each glyph referenced in the file may represent, for example, a mark, character, symbol, word or other elements appearing in the page. The glyphs may be defined in various ways known in the art. For example, each glyph may be stored with reference to outline information, such as outlines defined by Bezier curves and/or other shape information.

In some embodiments, prior to proceeding to block 304, the glyph optimization module 216 may optimize or otherwise alter one or more individual glyphs of the retrieved file prior to identifying components of each glyph (not illustrated). For example, the glyph optimization module 216 may reduce rough edges of the outline(s) of one or more glyphs referenced in the file. Reducing the rough edges may include, for example, decreasing a number of curve points associated with a given glyph. The rough edges may be the result, for example, of artifacts from scanning a page image and/or converting a glyph from some other format. Optimizing an individual glyph prior to block 304 may alternatively or additionally include reducing the number of control points associated with a given glyph. Reducing the number of control points may, for example, reduce the size needed to store the glyph, improve rendering performance and/or improve rendering quality. Optimizing the individual glyphs may also result in a larger number of similarities becoming evident in components or portions of different glyphs of the file, as discussed below.

At block 304, the glyph optimization module 216 identifies disjoint components and/or joint components within glyphs of the retrieved glyph-based file in order to compare the identified components to each other. Depending on the embodiment, the glyph optimization module 216 may identify one or more joint components, one or more disjoint components, or both joint components and disjoint components. A disjoint component may generally refer to a portion of a given glyph that is not connected to any other portion of the given glyph. Disjoint components may be identified, for example, by analyzing the glyph data for a given glyph to locate two or more portions or subsets of the glyph that do not connect to each other. A joint component, in contrast, may generally refer to a portion of a given glyph that is connected to at least one other portion of the given glyph. Despite being connected to another portion of a given glyph, a joint component may nonetheless be determined, using methods discussed below, to be identical or similar to a component of another glyph. Examples of joint components and disjoint components are discussed in more detail below with reference to FIGS. 4-6.

In embodiments in which the glyph optimization module 216 identifies joint components at block 304, the joint components may be identified within a given glyph, for purposes of comparing the joint component to components of other glyphs, using a variety of methods. For example, a portion of a glyph may be identified as a distinct joint component based at least in part by carving the glyph. Carving the glyph may include algorithmically eroding the glyph until a portion of the glyph disconnects from at least one other portion of the glyph. The disconnected portion may then be identified as a joint component to be compared to components of other glyphs, as described further below. The eroded glyph, or a composite glyph that includes one or more eroded components, may later be re-grown using a corresponding algorithm in order to generate a glyph matching the original glyph. Another method for identifying a joint component of a glyph may include identifying one or more continuous strokes within the glyph. Another method may include locating lines or strokes that connect through a central point or central line within the glyph. Yet another method may include searching the glyph data for portions of glyphs that match one or more previously identified components and/or one or more previously stored glyphs. In some such embodiments, identifying components at block 304 may be implemented as part of, or in parallel with, block 306 below, where the glyph optimization module 216 identifies and groups similar components.

Next, at block 306, the glyph optimization module 216 determines one or more component groupings of the components identified in block 304. The groups or groupings may be determined based at least in part by identifying similarities between components of different glyphs. As discussed above, in some embodiments, components of the glyphs may be identified during the grouping process, either instead of or in addition to components being identified prior to block 306. In some embodiments, the components identified at block 304 (which may include joint components and/or disjoint components) may generally each be considered candidate components for comparison with other glyphs' components in order to identify shared components among the glyphs of the file.

In some embodiments, grouping components may include identifying similarly shaped components and/or forming clusters of components based on shape. As will be appreciated by those of skill in the art, any of a number of different methods may be used to compare glyph components. In some embodiments, identifying similar components may include applying a relatively fast comparison method that serves as a coarse filter, then a relatively slower comparison method that serves as a finer filter to compare components that have met a given threshold using the coarse filter method. An example of a coarse filtering method to determine similarity between two components may be, for example, comparing descriptors for the components. A descriptor may be, for example, a shape context descriptor that includes an array of values that generally represent a shape. For example, a shape context descriptor may reference the number of contour pixels that fall into each of a number of bins, but which do not capture all of the detail or information needed to fully render or display the glyph (or glyph component). Bins may be defined, for example, by a certain number of distances and orientations that form a circular grid or other pattern that divides a space in which the glyph or component may be rendered. The same bin pattern may be compared to each component, and the number of contour points or pixels that fall into each bin for each component may be used to determine a shape context descriptor for the given component. As will be appreciated, shape context descriptors may be defined in a number of ways that may each result in different values that generally describe or represent the same shape. Accordingly, depending on the embodiment, any of a number of different methods may be used to determine shape context descriptors, but the same method should generally be used to determine the shape context descriptor for each component to be compared in the given embodiment. Once a descriptor is generated for each identified component, the descriptor values for each component may be compared to the descriptor values for each other component in order to identify groups of components that fall within a given threshold of distance between descriptor values. In some embodiments, the threshold may be set to be relatively small, such that tight groups or clusters are formed. In embodiments in which there is less desire or need to generate composite glyphs that are very similar to the original glyphs, a lower threshold may be used, resulting in looser cluster formation.

Another method that may be used to compare components, which may be considered a finer filter method than the shape context descriptor comparison discussed above, is to directly compare shapes as they would be rendered or displayed. For example, such a method may include comparing pixel data or other image data of the identified components. In some embodiments, the image data may only be compared for shapes or components that have passed a first, faster comparison method (such as a descriptor comparison). In other embodiments, the glyph optimization module 216 may compare the image data of each component to each other component without first applying a coarser filter.

The glyph optimization module 216 may group similar components, for example, by clustering the components based on one or more of the methods discussed above, such that each component in any given cluster is within a predetermined threshold of any other component of the cluster. In one embodiment, for example, the components' descriptors may be clustered based on a "nearest neighbor" approach. In some embodiments, when determining clusters and/or comparing descriptors, the glyph optimization module 216 may apply a transformation to one or more of the components, and/or may compare the components without reference to transformation data. For example, in some embodiments, each component may be stored with reference to an x value, a y value, and a transformation value. In some such embodiments, components may be compared such that components with different transformation values may nonetheless be considered similar to each other.

Once the glyph optimization module 216 has formed the groups or clusters of components, the illustrative method 300 proceeds to block 308, in which the glyph optimization module 216 selects a representative component from each group. The representative component may be used to replace each component of the group in the optimized file, as discussed further below. Accordingly, it may be desirable to select a representative component that represents a typical or average component from the group. In some embodiments, each group or cluster of components may be sorted based on shape descriptor values, and the representative component for each grouping may be selected to be the component closest to the center of the cluster (e.g., the component associated with the median shape descriptor value of the cluster). In other embodiments, the representative component may be selected based on other methods, such as determining the component that has the smoothest edges, least control points, and/or which requires the least amount of memory to store.

Next, at block 310, the glyph optimization module 216 generates composite glyphs, where each composite glyph references at least one representative component of a group. The composite glyphs may generally replace a corresponding glyph from the original glyph-based file when generating and/or storing the optimized file. As an example, consider a glyph from the original retrieved file that has been determined to comprise two components that have been grouped into two different groups by the glyph optimization module 216, based on the methods described above. A composite glyph to replace this glyph may be generated, where the composite glyph is defined with reference to the two representative components selected for the given two groups, rather than the glyph being defined with the full glyph description previously stored in the retrieved file. The composite glyph may additionally include information other than the references to the components comprising the glyph, such as a transformation value and/or location information regarding the glyph's location within the page image. Accordingly, in some embodiments, the composite glyph may be stored with sufficient information to render the glyph with substantially the same appearance as the originally stored glyph, but in a manner such that glyph components that frequently occur in different glyphs might only be defined once in the optimized glyph-based file.

In some embodiments, a composite glyph may be generated for each glyph of the retrieved file that includes a component that appears in any other glyph of the file. In other embodiments, representative components and composite glyphs referencing those representative components may only be stored when certain criteria is met. As one example, the glyph optimization module 216 may consider the storage space that would be saved by replacing a given group of components with references to a representative component of the group. For example, in some embodiments, the glyph optimization module 216 may store a representative component, as well as composite glyphs referencing the given representative component, when at least a certain minimum number of composite glyphs would reference the given representative component. In other embodiments, the glyph optimization module 216 may generate and store a composite glyph to replace any glyph that contains at least a minimum number of components that are similar to components of at least one other glyph.

Once the glyph optimization module 216 has generated composite glyphs at block 310, the illustrative method proceeds to block 312. At block 312, the glyph optimization module stores an optimized file including the generated composite glyphs in one or more data stores, such as glyph-based file data store 112. In some embodiments, the glyph optimization module 216 may store a new optimized glyph-based file at block 312. In other embodiments, the glyph optimization module may modify the original glyph-based file to replace at least a subset of the glyphs with composite glyphs. The optimized file may generally include some glyphs stored as they were in the original file (such as glyphs for which no composite glyph was generated), as well composite glyphs in place of at least a subset of the original glyphs from the retrieved file. Each composite glyph may be defined, for example, with reference to the one or more components making up the glyph, as well as additional information to be used to reconstruct the glyph (such as transformation information, location information, etc.). The shared components (e.g., representative components discussed above) may be stored, for example, in a shared component table associated with the optimized file. After storing the optimized file, the illustrative method ends at block 314.

Figure 4:
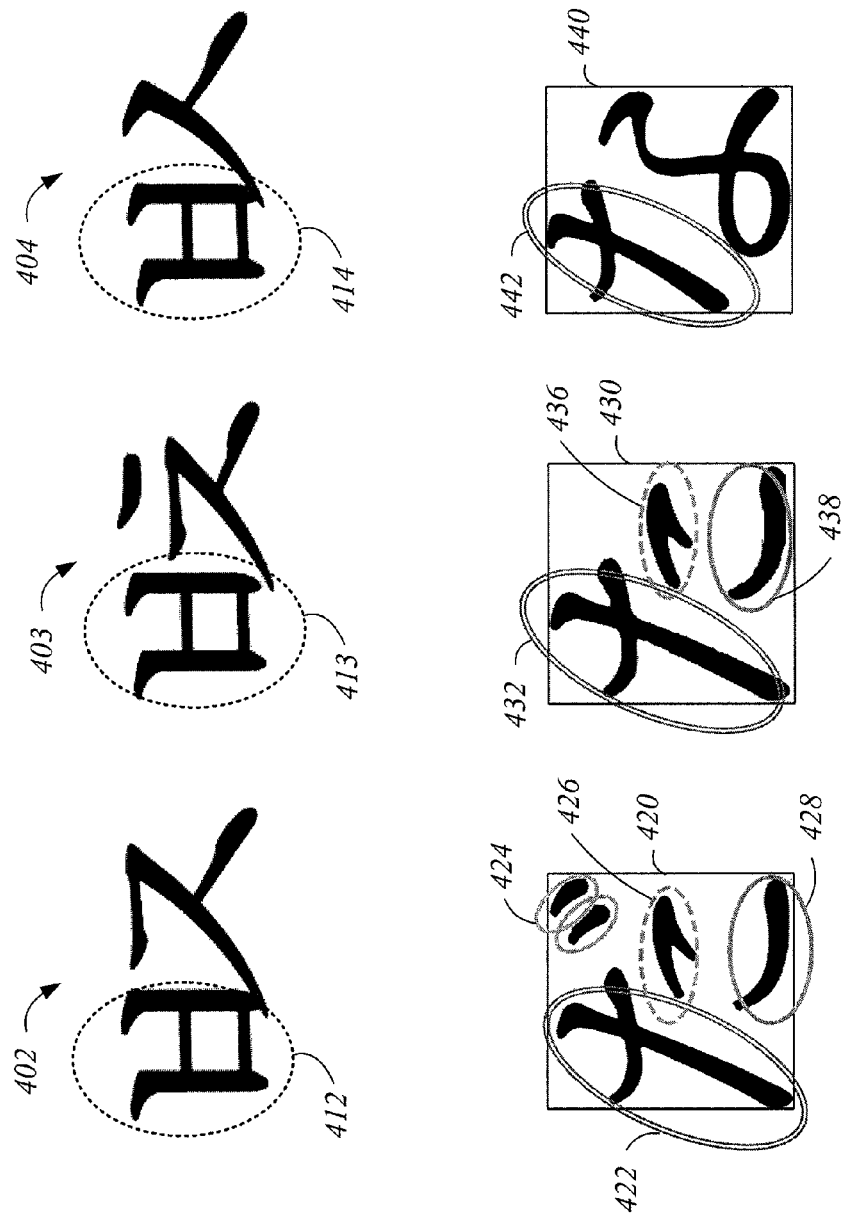
FIGS. 4 and 5 include representations of glyphs that include similar components.

FIG. 4 includes representations of glyphs that include similar components. As illustrated, glyphs 402, 403 and 404 each include the same or similar components 412, 413 and 414, respectively. In some embodiments, the glyph optimization module 216 may identify components 412, 413 and 414 according to one or more methods described above, such as described with reference to block 304 of illustrative method 300. According to some embodiments, component 412 of glyph 402 may be considered to be a joint component based on the component 402 touching or being connected to another portion of the glyph 402. In contrast, component 413 of glyph 403 may be considered a disjoint component based on component 413 not being connected to any other portion of the glyph 403. While component 412 may be identified as a joint component, and component 413 may be identified as a disjoint component, the glyph optimization module 216 may generate, in some embodiments, composite versions of glyph 402 and glyph 403 that each include a reference to the same representative component (such as component 412, component 413, component 414, or some other representative component selected by the glyph optimization module for this group of components).

As further illustrated in FIG. 4, glyphs 420, 430 and 440, which may each appear in a given glyph-based file, may be replaced with composite glyphs in a corresponding optimized file generated by the glyph optimization module 216 based on the methods described above. As illustrated, glyph 420 includes disjoint components 422, 424 (which appears twice in glyph 420), 426 and 428. Glyph 430 includes disjoint components 432, 436 and 438. In some embodiments, the glyph optimization module 216 may identify component 422, component 432, and component 442 as a group, and may then select one of the components of this group as a representative component to be referenced by composite glyph versions of glyph 420, glyph 430 and/or glyph 440. Similarly, the glyph optimization module 216 may determine a second group that includes components 426 and 436, as well as a third group that includes components 428 and 438. Accordingly, the eight total components combined between the original glyphs 420 and 430 may be replaced, in some embodiments, with two composite glyph versions of glyphs 420 and 430, where the composite glyphs reference a total of just four components combined.

Figure 5:
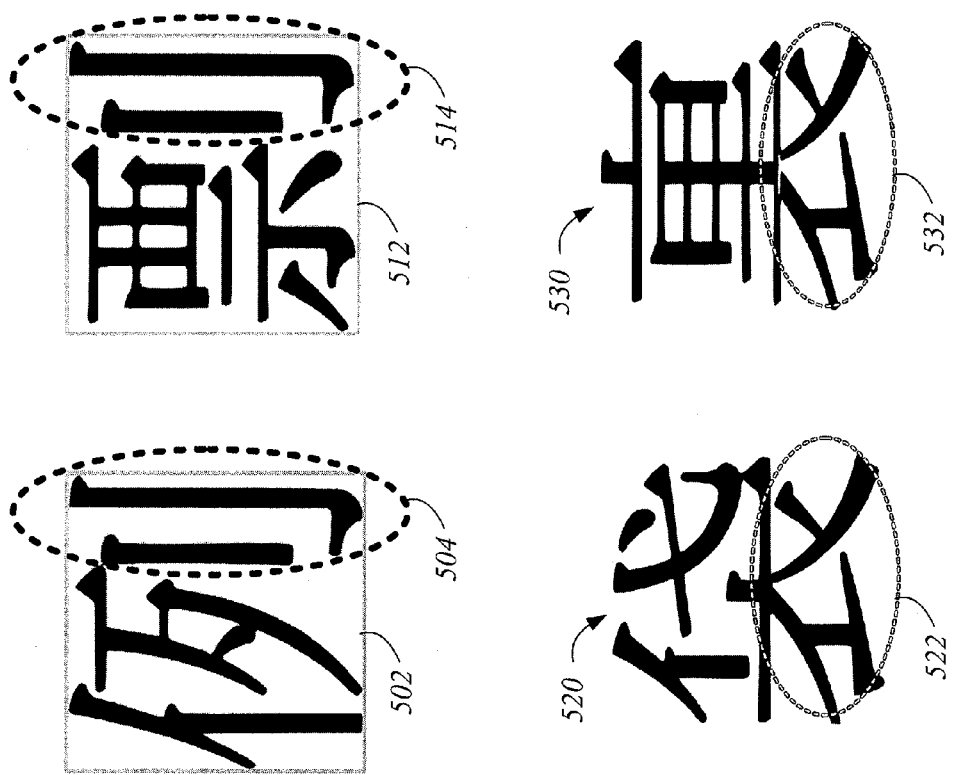

FIG. 5 includes additional representations of glyphs that include similar components. As illustrated, glyph 502 and glyph 512 each include similar disjoint components 504 and 514. In some embodiments, either component 504 or component 514 may be stored by the glyph optimization module 216 as a representative component for the group consisting of components 504 and 514 (and any other similar components from other glyphs of the given file). In other embodiments, glyph optimization module 216 may store two separate representative components for the disjoint sub-components appearing within each of components 504 and 514. In some embodiments, the glyph optimization module 216 may determine whether to store the representative component for components 504 and component 514 as a single component or as two components (sub-components) based on whether either sub-component appears in any glyphs of the file without the other sub-component appearing in the same arrangement as in glyphs 502 and 512.

FIG. 5 additionally includes glyphs 520 and 530, which include joint components 522 and 532, respectively. In some embodiments, the glyph optimization module 216 may identify joint components 522 and 532 using the methods described herein, and may generate a composite glyph for each of glyph 520 and glyph 530 that references the same representative component in place of both component 522 and component 532.

Figure 6:
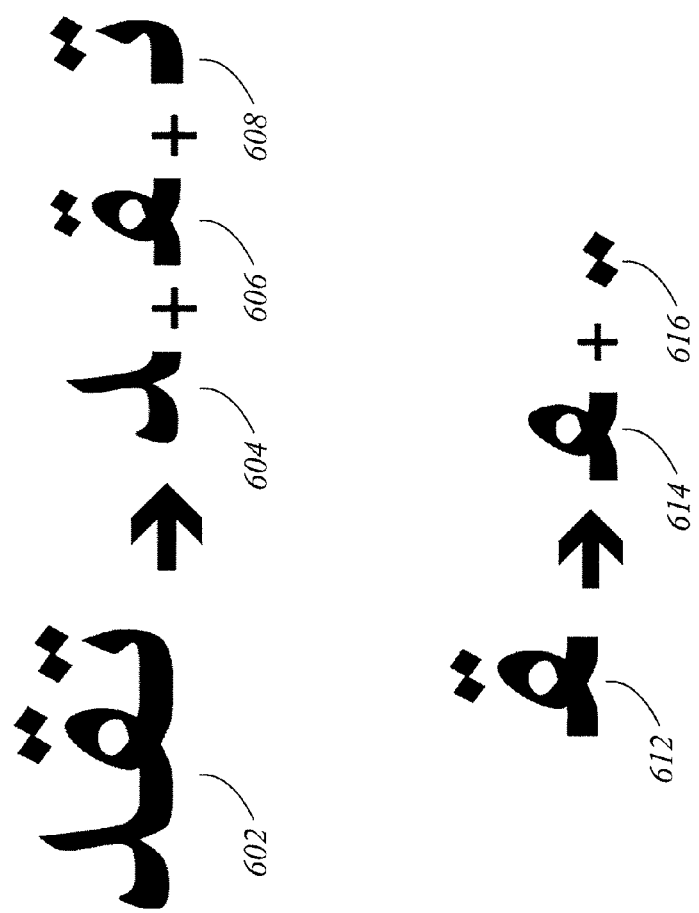
FIG. 6 includes representations of glyphs separated into components.

FIG. 6 includes additional representations of glyphs separated into components. In different embodiments, the Arabic word 602 may be stored in an original, non-optimized file as either a single glyph or as separate glyphs for each letter or character of the word. As illustrated, the glyph optimization module 216 may analyze the word 602 to separate the word into its component characters 604, 606 and 608. In embodiments in which word 602 is stored in the original file as a single glyph, the individual characters 604, 606 and 608 may be identified by the glyph optimization module 216 as joint components of the word glyph 602, according to the methods described above. For example, the glyph optimization module 216 may recognize each of components 604, 606 and 608 as being substantially similar to previously stored glyphs and/or components of other glyphs appearing in the file. In other embodiments, the glyph optimization module 216 or another module may have previously broken the word 602 as it appeared in the original page image into its component glyphs. As illustrated, the glyph optimization module 216 may further optimize character glyph 606 by separating the character into two disjoint components, illustrated by character 612 being separated into component 614 and component 616. Accordingly, each of components 614 and 616 may be considered by the glyph optimization module 216 as a potential candidate to be grouped with other similar components appearing in glyphs of the file, and to be potentially replaced with a reference to a representative component of the corresponding group.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for optimizing a file that includes a plurality of glyphs, the system comprising:

a data store configured to store a file comprising a plurality of glyphs, wherein each glyph represents a character or symbol; and a computing device in communication with the data store, the computing device configured to perform an ordered sequence of:

retrieve the file comprising a plurality of glyphs from the data store;

analyze the plurality of glyphs to identify a plurality of joint components within the plurality of glyphs, wherein each of the plurality of joint components is identified by eroding a glyph of the plurality of glyphs until a portion of the glyph disconnects from at least one other portion of the glyph and selecting the portion of the glyph as the joint component;

compare shape descriptor values associated with the plurality of joint components, wherein an individual joint component of the plurality of joint components is represented at least in part by one or more shape descriptor values that represent a shape of the individual joint component;

determine one or more groupings of similarly-shaped joint components within the plurality of joint components at least in part by identifying a set of joint components associated with shape descriptor values that are each within a threshold distance from other shape descriptor values associated with other joint components in the set;

select one of the plurality of joint components as a representative component for each of the determined one or more groupings of similarly-shaped joint components;

generate a composite glyph for one or more of the plurality of glyphs, wherein each composite glyph comprises a reference to at least one representative component and instructions for assembling the composite glyph using the at least one representative component; and create an optimized glyph file that includes the composite glyph for the one or more of the plurality of glyphs.

2. The system of claim 1, wherein each representative component is referenced by at least two of the generated composite glyphs.

3. A computer-implemented method, as implemented by one or more computing devices configured with specific executable instructions, for optimizing a glyph-based file, the computer-implemented method comprising an ordered sequence of:

identifying a plurality of joint components within a plurality of glyphs, wherein the plurality of joint components comprises a first joint component that is identified by eroding a glyph of the plurality of glyphs until a portion of the glyph disconnects from at least one other portion of the glyph and selecting the portion as the first joint component;

comparing one or more first shape descriptor values associated with the first joint component to one or more second shape descriptor values associated with a second joint component of the plurality of joint components, wherein the one or more first shape descriptor values represent a shape of the first joint component and the one or more second shape descriptor values represent a shape of the second joint component;

determining a grouping of similarly-shaped joint components within the plurality of joint components, wherein the grouping of similarly-shaped joint components comprises at least the first joint component and the second joint component based at least in part on a determination that the one or more second shape descriptor values are within a threshold distance from the one or more first shape descriptor values;

selecting one of the plurality of joint components as a representative component for the determined grouping of similarly-shaped joint components; and generating a composite glyph for one or more of the plurality of glyphs, wherein the composite glyph comprises a reference to at least one representative component.

4. The computer-implemented method of claim 3, wherein identifying similarly-shaped joint components comprises comparing shape descriptors associated with each of two or more of the plurality of joint components, wherein a shape descriptor comprises one or more values that represent a shape.

5. The computer-implemented method of claim 4, wherein identifying similarly-shaped joint components further comprises determining that a difference between a descriptor associated with the first joint component and a descriptor associated with a second joint component is less than a threshold.

6. The computer-implemented method of claim 3, wherein selecting a representative component for the determined grouping of joint components comprises:

sorting joint components in the grouping of similarly-shaped joint components based on shape descriptor values; and selecting a median joint component having a median position in the sorted grouping of similarly-shaped joint components.

7. The computer-implemented method of claim 3, wherein identifying similarly-shaped joint components comprises comparing image data associated with each of two or more of the identified joint components.

8. The computer-implemented method of claim 3, wherein identifying similarly-shaped joint components comprises rotating or scaling at least one of the identified joint components.

9. A system for optimizing a file that includes a plurality of glyphs, the system comprising:

a data store configured to store a file comprising a plurality of glyphs; and a computing device in communication with the data store, the computing device configured to perform an ordered sequence of:

retrieve the file comprising a plurality of glyphs from the data store;

identify a plurality of joint components within the plurality of glyphs, wherein the plurality of joint components comprises a first joint component that is identified by eroding a glyph of the plurality of glyphs until a portion of the glyph disconnects from at least one other portion of the glyph and selecting the portion as the first joint component;

compare one or more first shape descriptor values associated with the first joint component to one or more second shape descriptor values associated with a second joint component of the plurality of joint components, wherein the one or more first shape descriptor values represent a shape of the first joint component and the one or more second shape descriptor values represent a shape of the second joint component;

determine a grouping of similarly-shaped joint components within the plurality of joint components, wherein the grouping of similarly-shaped joint components comprises at least the first joint component and the second joint component based at least in part on a determination that the one or more second shape descriptor values are within a threshold distance from the one or more first shape descriptor values;

select one of the plurality of joint components as a representative component for the determined grouping of similarly-shaped joint components; and generate a composite glyph for one or more of the plurality of glyphs, wherein the composite glyph comprises a reference to at least one representative component.

10. The system of claim 9, wherein the computing device is further configured to store an optimized file in the data store, wherein the optimized file includes the generated composite glyphs.

11. The system of claim 9, wherein each glyph represents at least one of a character, a symbol or a word.

12. The system of claim 9, wherein the plurality of glyphs are stored in the file with reference to outline information defining one or more curves.

13. The system of claim 9, wherein identifying at least one of the plurality of joint components within the plurality of glyphs comprises recognizing a previously stored first glyph within a second glyph.

14. The system of claim 9, wherein the first joint component is associated with an x value, a y value, and a transformation value.

15. A non-transitory computer-readable medium storing computer executable instructions that, when executed by one or more computing devices, configure the one or more computing devices to perform an ordered sequence of operations comprising:

identifying joint glyph portions within a plurality of glyphs, wherein the joint glyph portions comprise a first joint glyph portion that is identified by eroding a glyph portion within a glyph until the glyph portion disconnects from at least one other glyph portion within the glyph and selecting the glyph portion as the first glyph portion;

comparing one or more first shape descriptor values associated with the first joint glyph portion to one or more second shape descriptor values associated with a second joint glyph portion of the joint glyph portions, wherein the one or more first shape descriptor values represent a shape of the first joint glyph portion and the one or more second shape descriptor values represent a shape of the second joint glyph portion;

determining a grouping of similarly-shaped joint glyph portions, wherein the grouping of similarly-shaped joint glyph portions comprises at least the first joint glyph portion and the second joint glyph portion based at least in part on a determination that the one or more second shape descriptor values are within a threshold distance from the one or more first shape descriptor values;

selecting one of the identified joint glyph portions as a representative glyph portion for the determined grouping of similarly-shaped joint glyph portions; and generating a composite glyph for one or more of the plurality of glyphs, wherein the composite glyph comprises a reference to at least one representative glyph portion.

* * * * *